(12) United States Patent
Pinnavaia et al.

(10) Patent No.: US 7,485,282 B2
(45) Date of Patent: Feb. 3, 2009

(54) METHOD FOR THE PREPARATION OF METAL OXIDES IN NANOMETRIC PARTICLE FORM

(75) Inventors: Thomas J. Pinnavaia, East Lansing, MI (US); Seong-Su Kim, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 763 days.

(21) Appl. No.: 11/087,841

(22) Filed: Mar. 23, 2005

(65) Prior Publication Data
US 2005/0272592 A1 Dec. 8, 2005

Related U.S. Application Data

(60) Provisional application No. 60/556,999, filed on Mar. 26, 2004.

(51) Int. Cl.
| | |
|---|---|
| C01B 39/02 | (2006.01) |
| C01B 13/14 | (2006.01) |
| C01B 13/18 | (2006.01) |
| C01B 33/12 | (2006.01) |
| C01F 7/02 | (2006.01) |
| C01F 7/30 | (2006.01) |
| C04B 35/14 | (2006.01) |
| C04B 35/10 | (2006.01) |
| C04B 35/103 | (2006.01) |
| C04B 38/06 | (2006.01) |

(52) U.S. Cl. ............... 423/700; 423/335; 423/592.1; 423/625; 423/702; 501/81; 501/99; 501/100

(58) Field of Classification Search ......... 423/335, 423/592.1, 625, 700, 702; 501/81, 99, 100; 502/60
See application file for complete search history.

(56) References Cited

U.S. PATENT DOCUMENTS 6,476,275 B2    11/2002 Schmidt et al.
2003/0026755 A1 *  2/2003 Jaroniec et al. ......... 423/449.1

FOREIGN PATENT DOCUMENTS

WO    WO 03/006372 A1    1/2003

OTHER PUBLICATIONS

Yamamura, M., et al., Zeolites 14, 643-649 (1994).
Vogel, B., et al., Catalysis letters, 79, 107-112 (2002).
Landau, M. V., et al., Industrial & Engineering Chemistry Research 42, 2773-2782 (2003).
Zhang, P.Q., et al., Catalysis Letters 92 63-68 (2004).
Zhang, G.Y., et al., Chemistry of Materials 9 210-217 (1997).

(Continued)

Primary Examiner—David M Brunsman
(74) Attorney, Agent, or Firm—Ian C. McLeod

(57) ABSTRACT

A process is described for the synthesis of metal oxides in a nanometric particle form that cannot be easily obtained by conventional bulk synthesis techniques. The method makes use of Colloid Occluded Carbons (COC) and Colloid Imprinted Carbons (CIC) as reagents and as templating agents for the preparation of metal oxides in nanometric particle form. The nanometric particles are suitable useful in the field of chemical catalysis, particularly for petroleum refining when in porous form, and as sensors, optical wave guides, and coatings.

14 Claims, 8 Drawing Sheets

OTHER PUBLICATIONS

Hincapie, B.O., et al., Microporous and Mesoporous Materials 67 19-26 (2004).
Cai, Q., et al., Chemistry of Materials 13 258-263 (2001).
Nooney, R.I., et al., Chemistry of Materials 14 4721-4728 (2002).
Sadasivan, S., et a 1., Angewandte Chemie-InternationalEdition 41 2151-2153 (2002).
Suzuki, K., et al., Journal of the American Chemical Society 126 462-463 (2004).
Li, Z.; Jaroniec, M. J. Am. Chem. Soc., 2001, 123, 9208-9209.
Jacobs, P. A.; Martens,J. A. Stud. Surf. Sci. Catal., 1987, 33, 19.
Kim, S.S., et al. Chemistry of Materials 15 1664-1668, published Apr. 2003.
Carlsson, A. J. Am. Chem. Soc., 2000, 122, 7116-7117.

* cited by examiner

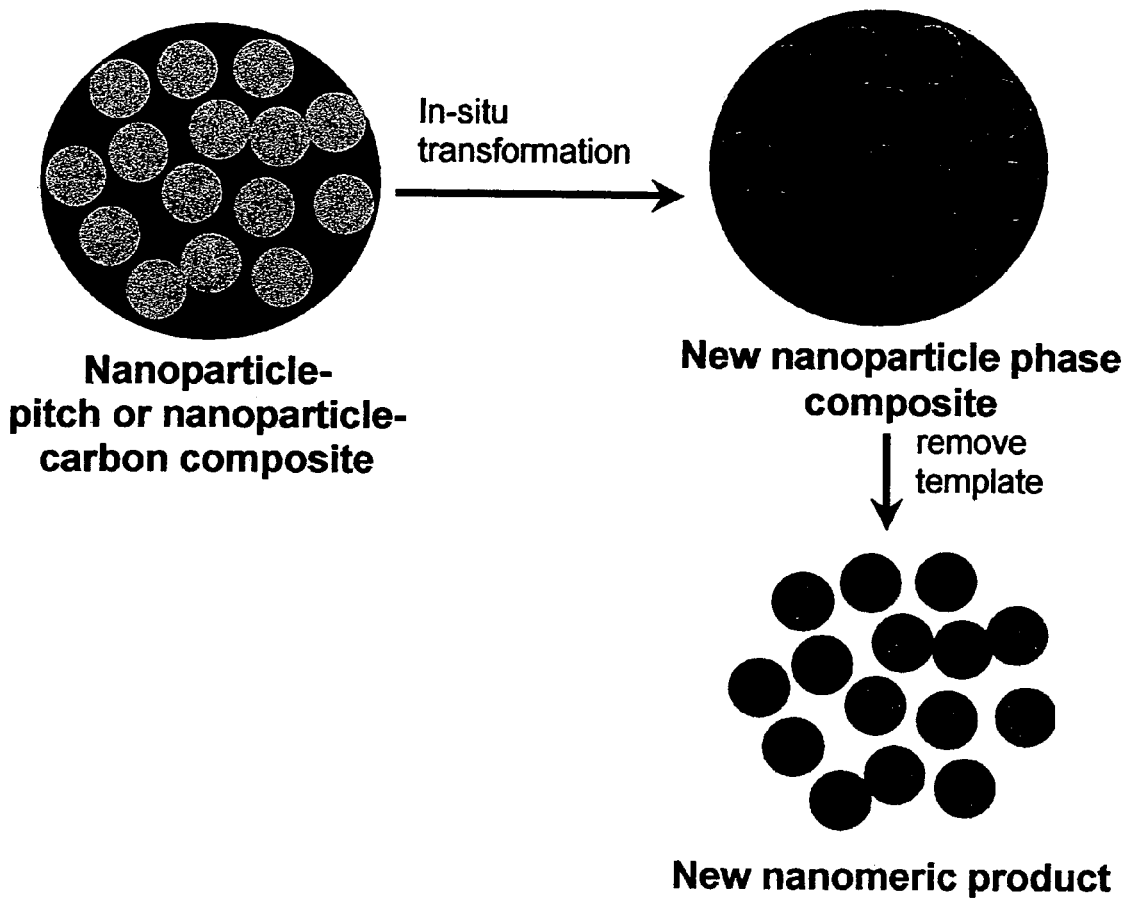
Figure 3. In-Situ Transformation of a Colloid Occluded Carbon (COC)

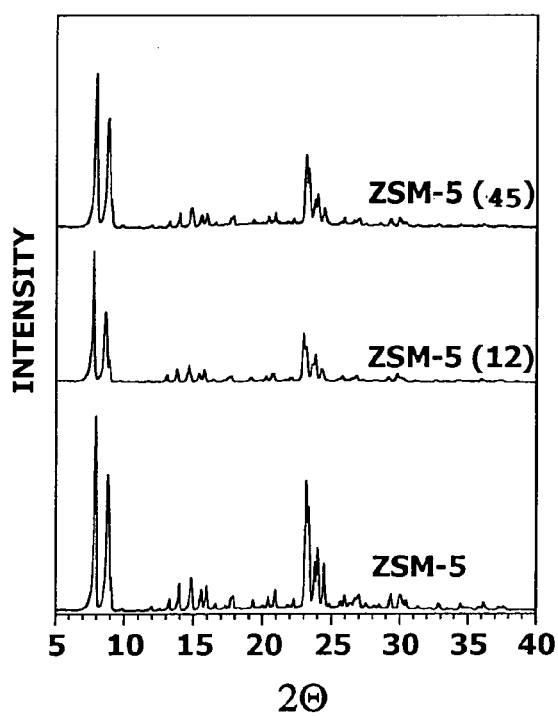
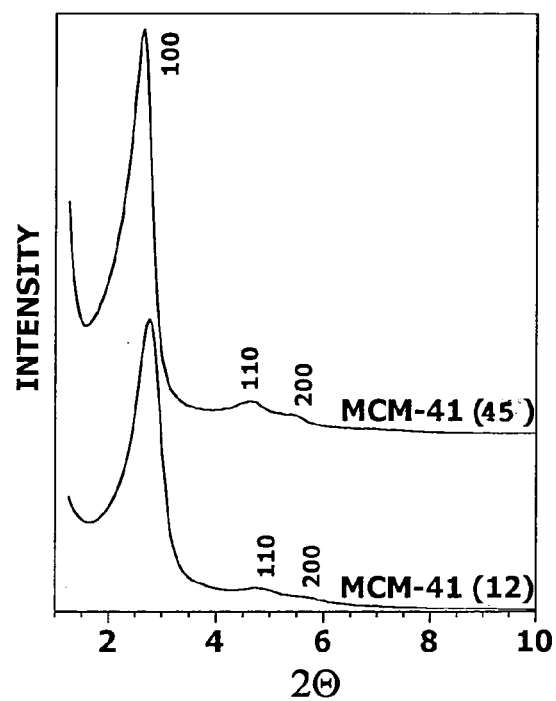
FIGURE 6A
FIGURE 6B

FIGURE 7A
(Prior Art)
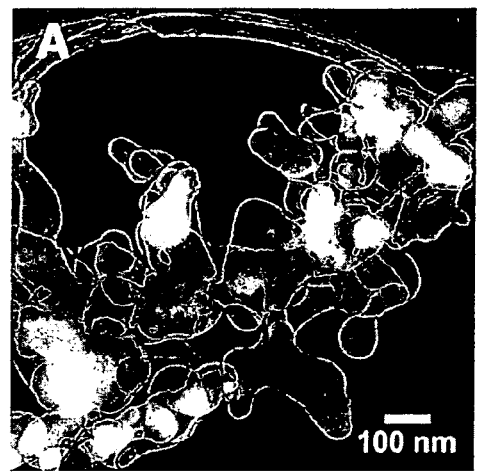
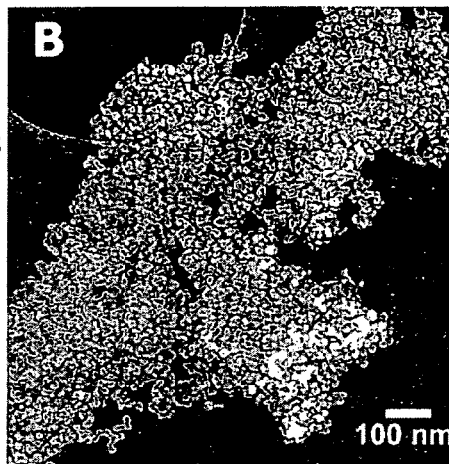
FIG. 7B
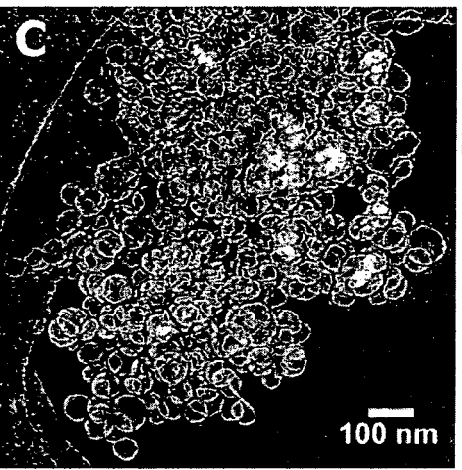
FIG. 7C
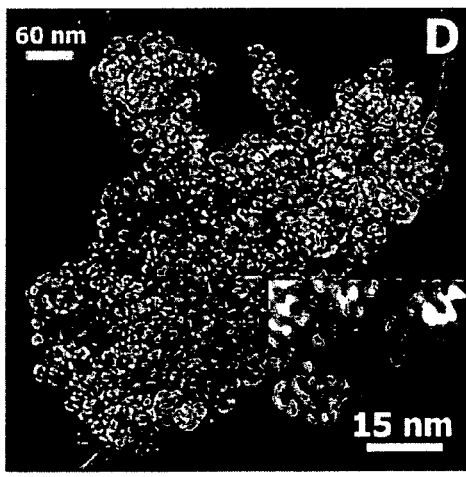
FIG. 7D
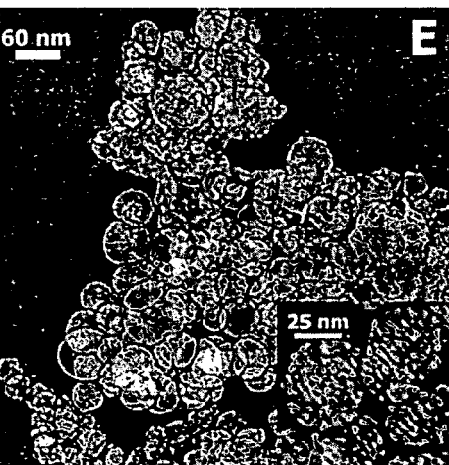
FIG. 7E

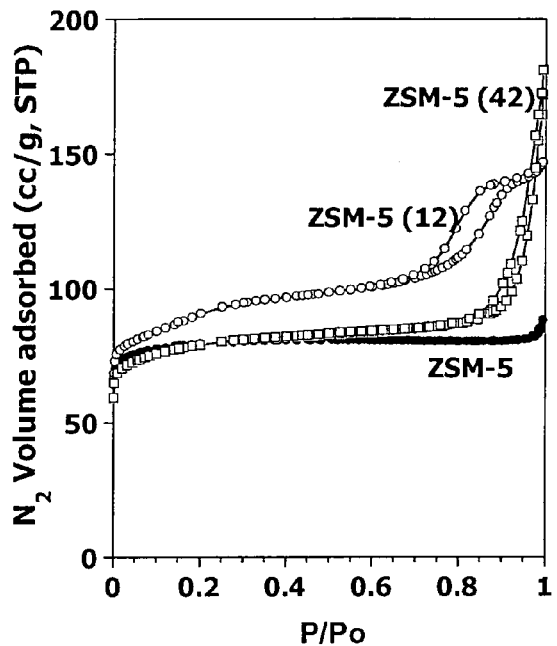
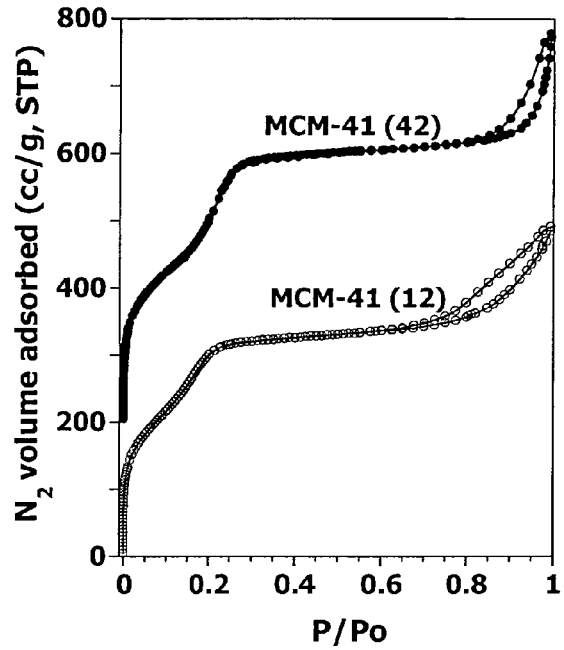
FIGURE 8A
FIGURE 8B
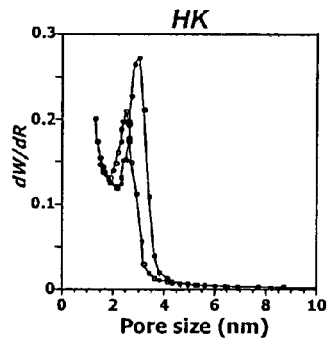
FIGURE 8C

METHOD FOR THE PREPARATION OF METAL OXIDES IN NANOMETRIC PARTICLE FORM

CROSS-REFERENCE TO RELATED APPLICATIONS

This application claims priority to provisional application Ser. No. 60/556,999, filed Mar. 26, 2004.

STATEMENT REGARDING FEDERALLY SPONSORED RESEARCH OR DEVELOPMENT

This invention was funded by the United States Government under National Science Foundation (NSF) Grant No. CHE-0211029. The Government has certain rights to this invention.

BACKGROUND OF THE INVENTION (1) Field of the Invention

This invention relates to metal oxide nanometric particles and to a process for the preparation thereof. In particular, the present invention uses a preformed carbon based template for forming the nano particles or a precursor to the nano particles.

(2) Description of the Related Art

Zeolites have been used extensively to catalyze a number of chemical reactions in refinery and petrochemical reactions, and mesostructured silicas have received much attention in diverse areas such as catalysis, adsorption, separation, and chromatography (Baerlocher, C. H., *Atlas of Zeolite Framework Types*, 5$^{th}$ ed.; Elsevier Science: Amsterdam, (2001)). Nanosized zeolites have been observed to have more catalytic activities than conventional zeolites with large particle size in refinery and petrochemical reactions, because fine particles in a nanometer scale have a remarkable potential as an easy-to-handle form having highly accessible mesopores from inter-particles (Yamamura, M., et al.,*Zeolites* 14, 643-649 (1994); Vogel, B., et al., *Catalysis letters*, 79, 107-112 (2002); Landau, M. V., et al., *Industrial & Engineering Chemistry Research* 42, 2773-2782 (2003); and Zhang, P. Q., et al., *Catalysis Letters* 92 63-68 (2004)).

Conventional methods for preparing metal oxides in nanometric particle form include the formation of the desired solid phase from reagents in a solution or gas phase. The solution phase approach generally requires very low reagent concentrations, the processing of large liquid volumes and, oftentimes, the presence of a particle growth regulator. Gas phase reactions are limited to the use of reagents that are volatile and to the formation of product phases that are stable at the temperatures needed to place the reagents in the gas phase.

In particular, zeolite nanoparticles have been prepared through careful control of the reaction stoichiometry, the crystallization time and temperature (Yamamura, M., et al., *Zeolites* 14, 643-649 (1994); Lovallo, M. C., et al., *Advanced Catalysis and Nanostructured Materials*, Academic Press: San Diego, (1997); Zhang, G. Y., et al., *Chemistry of Materials* 9 210-217 (1997); Hosokawa, H., et al., *Chemistry Letters* 32 586-587 (2003); and Hincapie, B. O., et al., *Microporous and Mesoporous Materials* 67 19-26 (2004)). On the basis of a modified Stober reaction process and the dilution quenching process, mesostructured silicas with the average particle size less than 100 nm have been prepared in highly dilute system (Cai, Q., et al., *Chemistry of Materials* 13 258-263 (2001); Nooney, R. I., et al., *Chemistry of Materials* 14 4721-4728 (2002); Sadasivan, S., et a l., *Angewandte Chemie-International Edition* 41 2151-2153 (2002); and Suzuki, K., et al., *Journal of the American Chemical Society* 126 462-463 (2004)).

U.S. patent application Ser. No. WO03/006372 A1 to Jaroniec et al., which is incorporated herein by reference, describes the formation of imprinted carbon structures. The carbon mesoporous structures have a diameter between about 1 nm to 30as a result of using the imprinting material. The imprinting material is colloidal silica. Pitch is a preferred carbon forming precursor. The imprinting material can be removed from the carbon structure by bases or acid, such as NaOH or HF. These carbon structures can be useful in the present invention.

U.S. patent application Ser. No. WO03/006372 A1 to Jaroniec et al., which is incorporated herein by reference, describes the formation of imprinted carbon structures. The carbon mesoporous structures have a diameter between about 1 nm to 30 as a result of using the imprinting material. The imprinting material is colloidal silica. Pitch is a preferred carbon forming precursor. The imprinting material can be removed from the carbon structure by bases or acid, such as NaOH or HF. These carbon structures can be useful in the present invention.

OBJECTS

It is an object of the present invention to provide metal oxide nanoparticles by a process which produces uniformity of particle size. It is also an object of the present invention to provide a process which is relatively low cost. These and other objects will become increasingly apparent by reference to the following description and the drawings.

SUMMARY OF THE INVENTION

The present invention relates to a process for producing a metal oxide composition in nanometric particle form which comprises: providing a template of a porous carbon material having interconnected cells with a nanometric dimension; and providing a metal oxide or metal oxide precursor in the porous carbon material; and removing the porous carbon metal by heating in an oxidizing atmosphere to remove the carbon and to provide the metal oxide in nanometric particle form.

In the present invention, the term "metal oxide" refers, in general, to solids in which oxygen is the primary space-filling atom. Thus, the term not only refers to compositions containing oxygen and one or more metallic or metalloid elements, but also to complex oxidic solids containing one or more non-metallic elements, in addition to one or more metallic or metalloid elements. An example of a complex metal oxide that contains nonmetallic elements, in addition to a metallic element, is hydroxyapatite with the formula $Ca_5(PO_4)_3OH$.

The present invention relates to a process for forming a metal oxide composition in nanometric particle form which comprises: providing a colloid imprinted carbon (CIC) as a nanometric particle template; forming through a chemical reaction a metal oxide or a metal oxide precursor in the mesopores of the CIC template; and removing the CIC from the product of step (b) by heating the CIC in an oxidizing atmosphere to thereby remove the CIC and to produce the metal oxide in nanometric particle form. Preferably the metal component of the metal oxide is selected from the metallic elements of groups 1 through 15 of the periodic table, the lanthanide elements, the actinide elements, and mixtures thereof. Preferably the metal oxide is a zeolite. Most preferably the metal oxide particles are selected from the group consisting of aluminas and silicas and mixtures thereof. Preferably the metal oxide nanometric particles are spherical and have a diameter of less than 100 nm. Preferably the metal oxide nanometric particles are a plate with a thickness of less than 100 nm. Preferably the metal oxide nanometric particles have a dimension of less than 100 nm in at least one dimension. Preferably the metal oxide nanometric particles aggregate to form larger agglomerates having dimensions greater than 100 nm. Preferably the CIC template is prepared from pitch tar. Preferably a metal alkoxide is chemically reacted in the mesopores of the CIC to form a metal oxide or a metal oxide precursor in nanometric particle form. Preferably the metal alkoxide is selected from the group consisting of a silicon alkoxide and an aluminum alkoxide. Preferably an aluminate, silicate or a mixture thereof is selected as a precursor to the metal oxide. Preferably the metal oxide is mesoporous.

The present invention also relates to a process for forming a metal oxide composition in nanometric particle form which comprises: (a) providing a colloid-occluded carbon (COC) for use as a reagent in anomeric particle form and as a template; (b) transforming the colloidal component of the COC to a metal oxide or a metal oxide precursor through a chemical reaction effective in retaining the morphology of the colloid reagent; (c) and removing the carbon component from the product of step (b) by heating in an oxidizing atmosphere to thereby remove the carbon and to produce the nanometric metal oxide particles. Preferably the metal cation of the metal oxide is selected from the metallic elements of groups 1 through 15 of the periodic table, the lanthanide elements, the actinide elements, and mixtures thereof. Preferably the nanometric metal oxide is a zeolite. Preferably the metal oxide particles are selected from the group consisting of aluminas and silicas and mixtures thereof. Preferably the metal oxide particles are spherical and have a diameter of less than 100 nm. Preferably the metal oxide particles are a plate with a thickness of less than 100 m. Preferably the size of the metal oxide particles is less than about 100 nm in at least one dimension. Preferably the metal oxide particles aggregate to form larger agglomerates having a dimension greater than 100 nm. Preferably the COC is prepared from colloid particles embedded in pitch tar. Preferably a non-oxidic colloid embedded in the COC is chemically reacted to form a metal oxide in nanoparticle form. Preferably an amorphous metal oxide colloid particle embedded in the COC is transformed into a crystalline metal oxide in nanometric particle form. Preferably an aluminate colloid, a silicate colloid or a mixture thereof is reacted to form a crystalline metal oxide in nanometric particle form. Preferably the metal oxide is mesoporous.

The present invention also relates to a composition which comprises nanoparticles of a metal oxide wherein at least one dimension of the particles is less than 100 nm prepared by a process as previously described.

DESCRIPTION OF THE DRAWINGS

The substance and advantages of the present invention will become increasingly apparent by reference to the following drawings and the description.

FIG. 3 is a schematic illustration of the in situ isomorphic transformation of colloidal embedded a colloid occluded carbon (COC) matrix and used as a reagent for the chemical conversion of the colloid to a new solid phase of approximately the same size and morphology as the colloidal reagent.

FIGS. 6A and 6B are XRD patterns of nanoparticles ZSM-5 and MCM-41 prepared through transformation of colloidal silicas supported in COC silica/carbon composite: FIG. 6A shows ZSM-5 nanoparticles after calcinations in air at 580° C. Included for comparison are the patterns for ZSM-5 made in the absence of a carbon template. FIG. 6B shows MCM-41 nanoparticles after calcinations in air at 580° C.

FIGS. 7A to 7E show TEM images of calcined forms (580° C.) for (FIG. 7A) ZSM-5 made in absence of a carbon template, and for the following nanoparticle products: (FIG. 7B) ZSM-5 (12); (FIG. 7C) ZSM-5 (42); (FIG. 7D) MCM-41 (12); and (FIG. 7E) MCM-41 (42). FIG. 7A shows a prior art composition.

FIGS. 8A and 8B show nitrogen adsorption-desorption isotherms for nanoparticles: FIG. 8A is for ZSM-5 nanoparticles after calcinations in air at 580° C. Included for comparison are the patterns for ZSM-5 made in the absence of a carbon template. FIG. 8B is for MCM-41 nanoparticles after calcinations in air at 580° C. The insert 8C shows the pore size.

DESCRIPTION OF PREFERRED EMBODIMENTS

Figure 1:
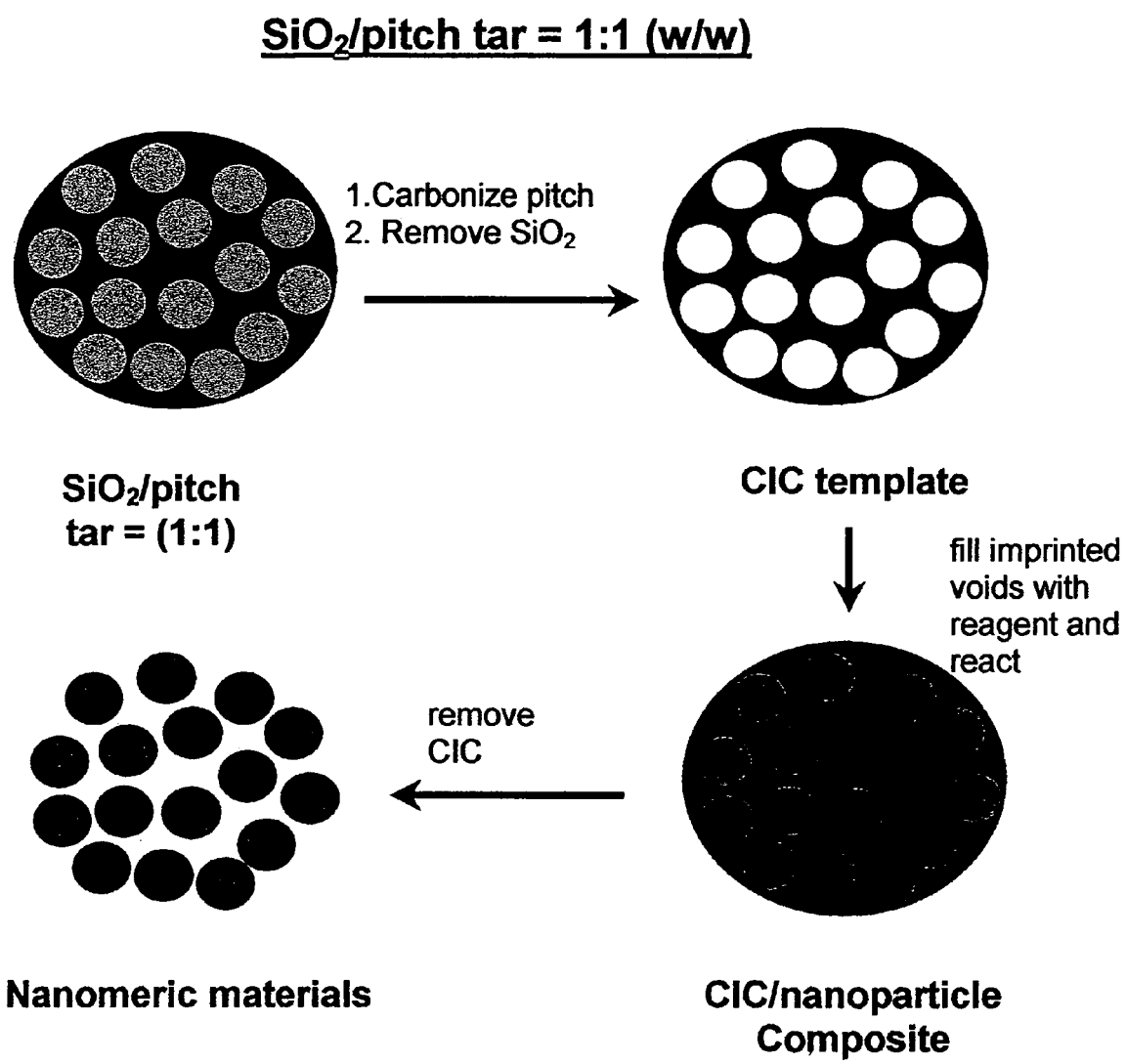
FIG. 1 is a schematic illustration of the nanocasting of nanometric metal oxides using a colloid imprinted carbon formed at a colloidal silica to mesophase pitch weight ratio of 1:1. Note that the resulting nanometric particles are well separated and of uniform size.

This invention provides a versatile method for the preparation of nanometric particles of solid state metal oxide compositions that cannot be easily prepared by conventional bulk synthesis techniques.

A "nanometric metal oxide particle" is defined here as a solid state composition that (i) comprises one or more metallic elements and oxygen and (ii) persists in composition and structure over a length scale less than about 100 nm in at least one dimension. Other components may be present in the composition, such as hydroxide ion and water, and even other counter anions such as halide ion, but the major space-filling element in an oxide composition is oxygen.

It is instructive to further illustrate the meaning of the term "nanometric particle" with examples. A metal oxide in the form of isolated primary particles with a spherical, cubic, prismatic, or rhombohedral shape and a diameter less than about 100 nm are examples of a metal oxide in nanometric particle form. Also, primary rod-shaped or fibrous metal oxide particles with a diameter less than about 100 nm in diameter, also meet the definition of an oxide in nanometric particle form, regardless of the length of the rod or fiber. Likewise, platy metal oxide particles less than 100 nm in thickness, but with a width greater than 100 nm meet the nanoparticle definition of this invention. Still further, a tubular metal oxide with a wall thickness less than about 100 nm is a nanometric oxide, regardless of the length or diameter of the tube. Most importantly, the aggregation, intergrowth or agglomeration of the above-mentioned primary particles into larger particle aggregates greater than 100 nm in size in three dimensions would also conform to the definition of the nanometric metal oxide compositions of this invention, so long as the primary particles comprising the aggregates, intergrowths and agglomerates exhibit a persistent composition and structure not greater than about 100 nm in at least one dimension. Microporous, super-microporous and mesoporous metal oxide compositions with pore sizes of about 0.3-1.0 nm, 1.0-2.0 nm and 2.0-50 nm, respectively, also are considered to be examples of nanometric metal oxide particles, whether in primary, aggregated or intergrown form, provided that the composition and pore structure is persistent over a distance of less than about 100 nm in at least one dimension. However, a mesoporous metal oxide with a uniform pore size of 3.0 nm and with a primary particle morphology that substantially exceeds 100 nm in all directions would not meet the definition of an oxide in nanometric particle form. In this latter case the mesoporous oxide could be described as being a "nanometric phase" or as having a "nanometric structure", because its pore structure repeats on length scale less than 100 nm, but it would not meet the definition of an oxide in nanometric particle form.

Nanometric particle forms of metal oxides and other solid state phases are preferred in a large number of practical settings. In heterogeneous chemical catalysis, for example, small nanometric catalyst particles are preferred over larger particles in part because they provide a larger surface area per unit mass upon which to carry out the chemical reaction. Small sizes of catalytic phases with porous open framework structures, such as zeolites and mesoporous molecular sieves, also are preferred. In this latter case, even though the catalytic reaction occurs on the internal surfaces of the porous solid phase, the reagents can more rapidly diffuse to the intracrystal active sites. Consequently, faster catalytic reactions are generally realized for small catalytic particles in comparison to larger particle forms of the catalyst.

The colloid imprinted carbon method (denoted the CIC method) of the present invention uses mesoporous carbons with uniform pore size distributions, formed through the direct, low-cost, colloidal silica imprinting of pitch, for example, as templates for the preparation of nanometric zeolites. This is in contrast to the prior art non-uniform zeolite catalysts represented by Schmidt, et al., U.S. Pat. No. 6,476, 275, for instance. The resulting products have highly uniform primary particle size distributions in comparison to conventional nanometric zeolites. Also, the CIC method is more efficient than the Schmidt et al method in reducing the number of processing steps, as well as in reducing the cost of making nanometric zeolites. Still further, the colloid occluded carbon method of our invention (denoted the COC method) also is a more efficient for producing a nanometric zeolite because it allows a silica colloid particle embedded in carbon to be chemically transformed to a nanometric zeolite phase with retention of the colloid particle morphology.

The improvement in diffusion provided by nanometric metal oxides also is a benefit in the design of sensor materials. That is, a sensor based on the use of small nanometric particles is much more response to an analyte in comparison to one constructed from larger metal oxides. Yet another use for nanoparticle compositions is in coating applications. Nanoparticles smaller than the wavelength of visible light (i.e., less than about 250 nm), can form transparent barrier films, protective coatings and optical wave guides.

The present invention provides a new method for preparing virtually any metal oxide composition in nanometric particle form, so long as the metal oxide is stable to an atmosphere containing carbon dioxide and carbon monoxide at a temperature below about 600° C. Solid colloidal particles less than 100 nm in at least one dimension, preferably formed from a low cost metal oxide, are embedded in an organic polymer matrix and the matrix is thermally transformed in the absence of air to carbon to form a colloid occluded carbon, denoted COC. In one embodiment of the invention the embedded colloid particles of the COC are removed by dissolution methods to form a colloid imprinted carbon, denoted CIC. The mesopores of the CIC then are impregnated with reagents effective in forming a metal oxide or a metal oxide precursor in the mesopores. The impregnated CIC is then heated in an oxidizing atmosphere, preferably air, to remove the carbon and to provide the metal oxide in nanometric particle form. The overall process of filling the pores of the CIC with reagents, transforming the reagents to a metal oxide or metal oxide precursor, and removing the carbon matrix by heating in an oxidizing atmosphere to produce the nanometric metal oxide particles is a form of nanocasting.

The second embodiment of the method allows for the in situ isomorphic chemical transformation of colloid particles embedded in a COC. In this process the colloid component of the COC is used as a reagent and transformed in situ by chemical reactions effective in forming a metal oxide or metal oxide precursor. The carbon component of the transformed COC is then removed by heating in an oxidizing atmosphere, preferably air, to produce the metal oxide in nanometric particle form. This embodiment of the invention eliminates the need to form a CIC when the colloid is suitable for use as a metal oxide precursor. This feature of the method is especially useful in transforming amorphous nanometric metal oxide particles directly into crystalline metal oxides in nanometric particle form.

The preferred method for forming the COC and CIC components of the present invention uses pitch as the carbon precursor, as disclosed by Jaroniec et al. (Li, Z.; Jaroniec, M. *J. Am. Chem. Soc.*, 2001, 123, 9208-9209.; Jaroniec, M,; Li, Z., previously cited), which are incorporated by reference. These COC and CIC templates are ideal matrices for the formation of nanometric metal oxide particles, in part, because the carbon matrix is unreactive under oxygen-free conditions.

Figure 2:
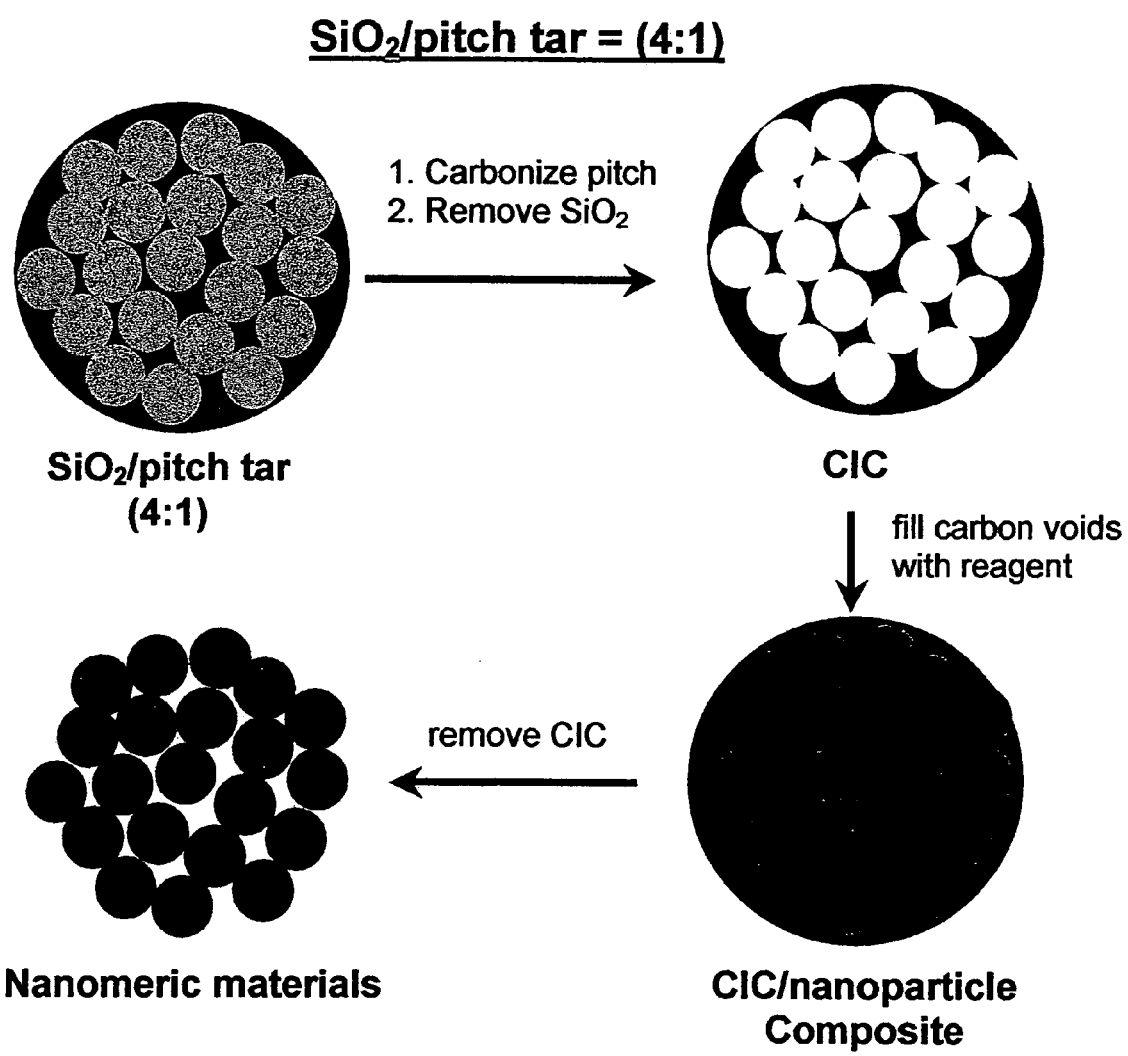
FIG. 2 is a schematic illustration of the nanocasting of nanometric metal oxides using a colloid imprinted carbon formed at a colloidal silica to mesophase pitch weight ratio of 4:1. Note that many of the resulting particles are aggregated, but of uniform domain size.

FIGS. 1 and 2 illustrate the preferred embodiment of the invention based on the use of silica spheres as the imprinting agent for the preparation of a colloid-imprinted carbon. FIG. 1 shows that for silica spheres with a diameter less than about 100 nm, a 1:1 (w/w) ratio of silica to pitch results in the formation of imprinted voids that are largely separated, allowing for the imprinting synthesis of single, well separated, metal oxide nanoparticles. Increasing the silica to pitch ratio to 4:1 (w/w) results in the formation of more aggregated nanometric particles, as illustrated schematically in FIG. 2. These agglomerated metal oxide nanometric particles are desirable for use as catalysts in condensed phase reactions, in part, because they can be easily filtered and recovered from the reaction mixture.

In the complementary embodiment of our methodology, the embedded colloid particles of a COC are used as a reagent for the in situ isomorphic conversion of the colloid to a new solid phase in nanometric particle form of approximately the same size as the initial colloid. This in-situ nanocasting method is illustrated schematically in FIG. 3.

EXAMPLES

The following examples describe the detailed steps needed to implement the invention:

Example 1

This example illustrates the synthesis and properties of a colloid occluded carbon (denoted COC) and the removal of the colloid from the carbon composite to form a colloid-imprinted carbon, denoted CIC. The methods used here are equivalent to those disclosed by Jaroneic (Li, Z.; Jaroniec, M. J. Am. Chem. Soc., 2001, 123, 9208-9209.; Jaroniec, M,; Li, Z. 2003, PCT 0306372). Mesophase pitch (AR grade MP-H, Mitsubishi Chemicals) was used as the initial polymer matrix. Commercial LUDOX AS-30, LUDOX As-40, SNOWTEX-OL, and SNOWTEX-ZL were used as the colloidal silicas.

Colloidal silica to pitch weight ratios between 0.8 and 1.6 were found to be effective in forming the CIC. The preparation of a COC and a CIC using SNOWTEX-ZL as the imprinting agent serves as a typical example. A 15-g portion of ground mesophase pitch was dispersed in 150 g of ethanol. Then, 60 g of SNOWTEX-ZL colloidal suspension (40% silica) was added, and the resulting mixture was stirred overnight at 50° C. to allow the solvent to evaporate under stirring. The air-dried mixture was further dried at 285° C. under nitrogen flow for 1 h. The dried colloidal silica-pitch composite was carbonized at 900° C. for 2 h under nitrogen. The resulting colloid occluded carbon (COC) composite was washed twice with 10 wt % hydrofluoric acid at room template to remove the silica template. The resulting CIC carbons formed in this way were denoted as CIC-13, CIC-24, CIC-45, and CIC-90, where the number indicates the approximate diameters of the silica spheres (in nanometers) used to imprint the carbon. As shown by the data in Table 1, the pore sizes of the imprinted carbons, as determined by nitrogen adsorption, were in good agreement with the sizes of the imprinting silica colloids.

TABLE 1

Textural properties of colloid-imprinted carbon (CIC) templates.

| Sample[a] | Imprinting Agent | Silica/ Pitch Mass Ratio | BET Surface Area ($m^2/g$) | Total pore volume ($cm^3/g$) |
|---|---|---|---|---|
| CIC-13 | LUDOX AS-30 | 1.20 | 235 | 0.59 |
| CIC-22 | LUDOX AS-40 | 1.60 | 154 | 0.55 |
| CIC-42 | SNOWTEX-OL | 0.80 | 71 | 0.43 |
| CIC-90 | SNOWTEX-ZL | 1.60 | 63 | 0.65 |

[a]The number contained in the sample label indicates the average pore size (nm) calculated from the adsorption branch of the nitrogen isotherm.

Example 2

This example illustrates the nanocasting synthesis of nanometric ZSM-5 zeolite, a zeolite that is an important additive for the FCC processing of petroleum. Tetraethylorthosilicate (TEOS), tetrapropylammonium hydroxide, sodium aluminate, and aluminum isopropoxide were used as reagents for the nanocasting synthesis of nanometric ZSM-5 zeolite.

A CIC template was impregnated to incipient wetness with a clear solution of tetrapropylammonium hydroxide, aluminum isopropoxide, water and ethanol. Following the slow evaporation of ethanol from the impregnated CIC at room temperature, TEOS was added to the mixture at a CIC:SiO$_2$ ratio of 2:1 (w/w). The composition of the impregnated synthesis gel on an oxide basis was 0.5 Al$_2$O$_3$:9 TPA$_2$O:0.15 Na$_2$O:50 SiO$_2$: 390 H$_2$O. The final mixture was heated in an autoclave at 180° C. for 48 h. The CIC was removed from the composite composition by calcination in air at 570° C. for 8 h. The final nanometric ZSM-5 products were denoted as ZSM-5 (13), ZSM-5 (22), ZSM-5 (42), and ZSM-5 (90), where the number in parenthesis indicates the average particle sizes determined from TEM images.

Table 2 provides the textural properties of nanometric ZSM-5 crystals formed through CIC nanocasting in comparison to a ZSM-5 zeolite prepared by conventional synthesis methods. (Jacobs, P. A.; Martens, J. A. Stud. Surf. Sci. Catal., 1987, 33, 19).

TABLE 2

Textural properties of ZSM-5 formed through CIC nanocasting[a]

| Sample | Micropore Surface Area, $S_{MIC}$[b] ($m^2/g$) | External surface area, $S_{EXT}$[b] ($m^2/g$) | BET surface area, $S_{BET}$[c] ($m^2/g$) | $S_{EXT}/S_{MIC}$ | $S_{EXT}/S_{BET}$ | Micropore Volume ($cm^3/g$) |
|---|---|---|---|---|---|---|
| ZSM-5 (13)[d] | 173 | 127 | 300 | 0.73 | 0.42 | 0.081 |
| ZSM-5 (22) | 190 | 59 | 250 | 0.31 | 0.24 | 0.090 |
| ZSM-5 (42) | 277 | 33 | 310 | 0.12 | 0.11 | 0.138 |
| ZSM-5 (90) | 234 | 21 | 256 | 0.09 | 0.08 | 0.115 |
| ZSM-5[e] | 321 | 16 | 337 | 0.05 | 0.08 | 0.150 |

[a]Samples were evacuated overnight at 250° C.
[b]From t-plots.
[c]From BET.
[d]The number contained in parenthesis indicates the average particle size (nm) obtained from ten TEM images.
[e]This sample was made from the same reagents, but in the absence of a CIC template.

For the conventional zeolite, only 8% of the total surface area arises from the external surfaces of the crystals. However, the same zeolite structure formed through CIC nanocasting shows increasing external surface area with decreasing elementary particle size. For the ZMS-5 (13) sample formed through the nanocasting of a CIC template with 13 nm pores, 42% of the total surface area arises from external surface area. The external surfaces of this zeolite are important in contributing to its petroleum cracking properties. Also, the total pore volume increases substantially with decreasing particle size of the zeolite.

The same methodology was successfully used for the nanocasting synthesis of nanometric particles of zeolite Beta using tetraethylammonium hydroxide in place of tetrapropylammonium ion as the zeolite structure director.

Example 3

This example illustrates the nanocasting synthesis of mesostructured silica molecular sieves with nanometric particle dimensions. CIC templates with pore sizes of about 42 and 90 nm were impregnated to incipient wetness with clear solutions of dodecyltrimethylammonium bromide, sodium hydroxide, and water. To the stirred mixtures was added tetraethylorthosilicate (TEOS) at a CIC:SiO$_2$ ratio of 4:1 (w/w).

The molar composition of the impregnated synthesis gels on an oxide basis was 0.5 $[C_{12}H_{25}N(CH_3)_3]^+$:0.24 $Na_2O$:1 $SiO_2$:60 $H_2O$. The final mixtures were heated in an autoclave at 100° C. for 48 h. The CIC and the alkylammonium ion surfactant were removed from the composite compositions by calcination in air at 570° C. for 6 h. The final nanometric mesostructured silicas were denoted as MS (42) and MS (90), where the number in parenthesis indicates the average particle sizes determined from TEM images. The textural parameters of the mesostructures formed through nanocasting are compared in Table 3 with those for a silica mesostructure obtained by conventional assembly methods.

TABLE 3

Textural properties of mesostructured silica molecular sieves in nanometric particle form in comparison to a conventional mesostructured silica molecular sieve.

| Sample | d spacing (nm) | Pore size (nm) | Wall thickness (nm) | Surface area ($m^2/g$) | $V_{Fra}$ ($cm^3/g$) | $V_{Tex}$ ($cm^3/g$) | $V_{TEX}/V_{Fra}$ |
|---|---|---|---|---|---|---|---|
| Bulk Meso-Si | 3.2 | 2.4 | 0.8 | 1125 | 0.57 | 0.09 | 0.16 |
| Meso-Si (CIC-90 nm) | 3.6 | 2.9 | 0.7 | 493 | 0.23 | 0.79 | 3.43 |
| Meso-Si (CIC-42 nm) | 3.8 | 2.6 | 1.2 | 489 | 0.23 | 0.68 | 3.00 |

Figure 4A:
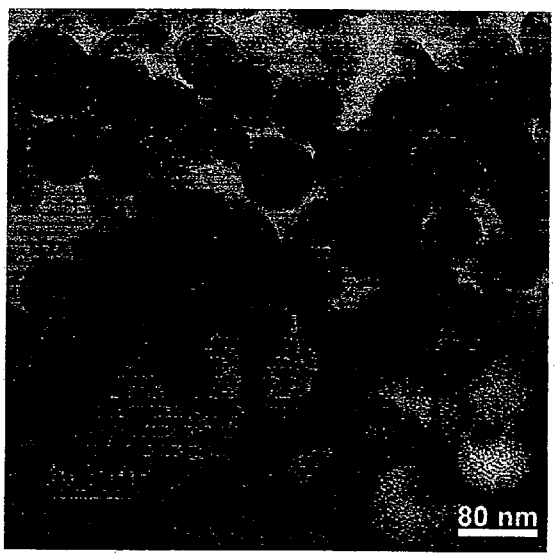
FIG. 4 shows transmission electron microscope (TEM) images of nanometric mesoporous silica molecular sieves prepared through nanocasting methods using colloid imprinted carbons (CIC) with pore sizes of about 90 nm and 42 nm as the templating agents.
Figure 4B:
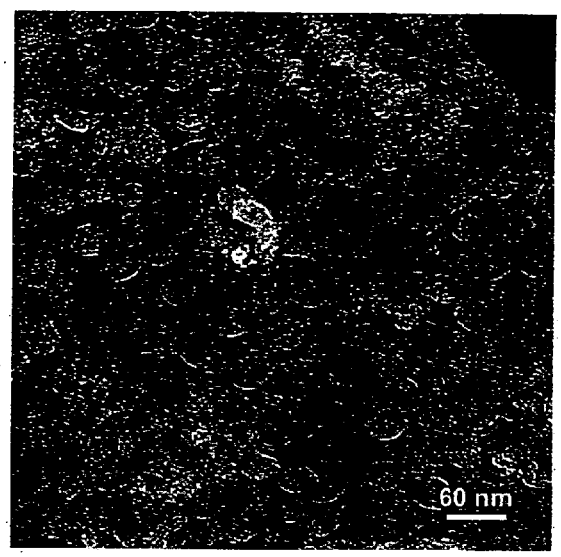

Note the dramatic increase in the textural pore volumes afforded by the CIC-templated mesostructures. FIGS. 4A and 4B provide TEM images for a CIC templated structure.

Example 4

This example illustrates the in-situ isomorphic transformation of a silica colloid in a COC to a ZSM-5 zeolite in nanometric particle form. In this method the initial colloidal silica imprinting agent is left embedded in the host COC matrix and subsequently converted by chemical means to the new solid state zeolite phase of approximately the same size as the initial imprinting agent.

A COC carbon nanocomposite was prepared by embedding mesophase pitch with colloidal silica, namely LUDOX AS-30 with the average particle size of 12 nm, at a silica to pitch weight ratio of 0.60, as described in Example 1.

A solution of tetrapropylammonium hydroxide and aluminum isopropoxide was prepared in a mixture water and ethanol. The colloidal silica-carbon nanocomposite was added to this mixture to afford a reaction mixture with the following molar ratio of reagents [0.5 $Al_2O_3$:9 $TPA_2O$:0.15 $Na_2O$:50 $SiO_2$:390 $H_2O$:128 EtOH]. The final mixture was stirred for 3 h at room temperature and then heated in an autoclave at 180° C. for 48 h. The carbon was removed from the composite composition by calcination in air at 570° C. for 8 h.

Figures 5A, 5B:
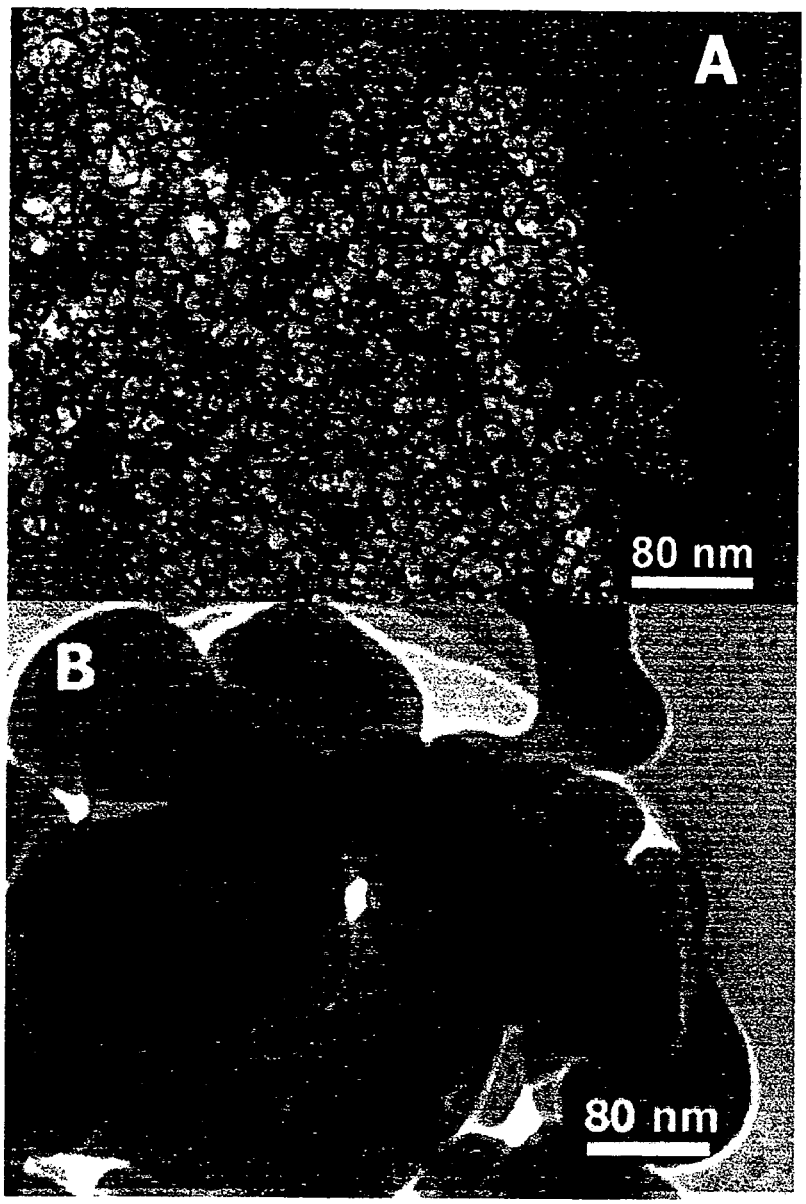
FIG. 5A shows TEM image of zeolite ZSM-5 in nanometric particle form prepared by in-situ isomorphic transformation of a silica colloid in a colloid occluded carbon prepared from mesophase pitch and colloidal silica, LUDOX AS-30, and subsequently converted to the zeolite phase by reaction with tetrapropylammonium hydroxide and aluminum isopropoxide in water-alcohol solvent.
FIG. 5B shows TEM image of a conventional bulk synthesis of ZSM-5 by prior art methods under equivalent reaction conditions.

For comparison purposes a conventional ZSM-5 zeolite was prepared under the same reaction conditions in the absence of a templating carbon matrix. Table 4 compares the textural properties of the reaction products and FIGS. 5A and 5B compare the particle sizes of the products.

TABLE 4

Textural properties of ZSM-5 formed through conventional bulk synthesis and by in-situ isomorphic transformation of a silica colloid embedded in a COC.

| Sample | $S_{micro}$ ($m^2/g$) | $S_{ext}$ ($m^2/g$) | $S_{ext}/S_{micro}$ | $V_{micro}$ ($cm^3/g$) | $V_{ext}$ ($cm^3/g$) | $V_{ext}/V_{micro}$ |
|---|---|---|---|---|---|---|
| ZSM-5 prepared by conventional Methods | 267 | 1 | 0.004 | 0.12 | 0.01 | 0.08 |
| ZSM-5 prepared by In-situ transformation | 269 | 39 | 0.14 | 0.11 | 0.1 | 0.9 |

The carbon template clearly prevents the growth of the silica colloid during its transformation to ZSM-5 (FIG. 5A), whereas substantial particle growth occurs in the absence of a colloid-imprinted template (FIG. 5B).

Example 5

This example illustrates the preparation of hexagonal MCM-41 mesostructured silica through in situ isomorphic transformation of a 12 and 45 nm silica colloid particles embedded in a COC. The COC compositions were added into a clear solution of $C_{12}N(CH_3)_3Br$, NaOH, and water and the mixture was stirred at room temperature for 3 h. The overall reaction stoichiometry (moles) was as follows: 1 $SiO_2$:7.0 C:0.4 $C_{12}N^+$:0.36 NaOH:44~88 $H_2O$. The final mixture was heated in an autoclave at 100° C. for 72 h. The transformed COC was dried and calcined at 570° C. to remove the carbon component. X-ray diffraction verified the presence of a hexagonal MCM-41 structure and TEM verified the almost exclusive presence of aggregated spherical MCM-41 particles with diameters of about 12 and 45 nm.

Example 6

This example illustrates the nanocasting synthesis of nanosized spinel $CoCr_2O_4$ using a CIC as a template. In a typical synthesis of nanocasted $CoCr_2O_4$ a CIC templated by a 13 nm silica colloid, denoted CIC-13, was impregnated to incipient wetness with a clear solution of cobalt nitrate, chromium nitrate, and ethanol. The ethanol was slowly evaporated at room temperature to provide a reaction mixture with a CIC/$M(NO_3)_3.9H_2O$, where M=Cr+Co) weight ratio of 5.0. The dried impregnated CIC carbon was placed in crucible in an oven and heated at 600° C. for 45 min in air to form the spinel and remove the carbon template. The presence of a $CoCr_2O_4$ spinel phase was verified by X-ray diffraction. TEM verified the nearly exclusive presence of aggregated spherical nanometric particles with a diameter near 13 nm.

The present invention further demonstrates the direct transformation of colloid silica presented in COC to ZSM-5 and MCM-41 with very uniform particle size. The particle sizes of nanosized ZSM-5 and MCM-41 are correlated with the same particle size of colloidal silicas with nominal diameters. This transformation route is the highly direct and low-cost because it reduces the steps for making uniform nanosized ZSM-5 and MCM-41, and save the colloidal silicas in COC composite.

Examples 7 and 8

In these examples, LUDOX AS-30 (Aldrich, average particle size of 12 nm) and SNOWTEX-OL (Nissan Chemical America Corporation, average particle size of 45 nm) were used as colloidal silica sources. COC composite is prepared with silica to pitch weight ratio of 0.6 for LUDOX AS-30 and 0.4 for SNOWTEX-OL, respectively (Kim, S. S., et al., *Chemistry of Materials* 15 1664-1668 (2003)). In the preparation of COC composite, Colloidal silica was added in the mesophase pitch dispersed in ethanol. The air-dried mixture of Colloidal silica and pitch was further dried at 285° C. under nitrogen flow for 1 h. Then, the dried colloidal silica-pitch composite was carbonized at 900° C. for 2 h under nitrogen. The final COC composites were denoted as COC-12 and COC-45, the number indicates the average particle sizes provided by manufacturers.

In a typical transformation of colloidal silica in COC into nanosized ZSM-5 with the average particle size of 12 and 45 nm, respectively, COC was added into a clear solution of tetrapropylammonium hydroxide, aluminum iso-propoxide, water, and ethanol. The mixture was stirred at room temperature for 3 h. The molar composition of the final mixture was 1 $SiO_2$:7.0 C:0.15 TPAOH:0.02 $Al(OiPr)_3$:0.007 NaOH:3.2 EtOH:8 $H_2O$. The final mixture was heated in an autoclave at 180° C. for 72 h. The carbon was removed from composite by calcinations in air at 580° C. for 6 h. The final nanosized ZSM-5 products were denoted as ZSM-5 (12) and ZSM-5 (45), where the number in parenthesis indicates the average particle sizes judged from TEM images. For the purpose comparison we also prepared ZSM-5 using LUDOX AS-30 as silica source in the absence of COC composite.

Example 9

Nanosized MCM-41 through colloidal silica in COC was prepared by the following: COC was added into a clear solution of $C_{12}N(CH_3)_3Br$, NaOH, and water. The mixture was stirred at room temperature for 3 h. The stoichiometric ratio of 1 $SiO_2$:7.0 C:0.4 $C_{12}N^+$:0.36 NaOH:44~88 $H_2O$. The final mixture was heated in an autoclave at 100° C. for 72 h. The final MCM-41 silicas after removal of carbon were denoted as MCM-41 (12) and MCM-41 (45).

X-ray diffraction patterns were recorded on a Rigaku Rotaflex diffractometer using $Cu_{K\alpha}$ radiation ($\lambda$=1.542 Å). Transmission electron microscopy (TEM) studies were carried out on a JEOL 100 CX instrument using an electron beam generated by a CeB6 filament and an acceleration voltage of 120 kV. Samples for TEM studies were prepared by dipping a carbon-coated copper grid into a suspension of samples in ethanol that was pre-sonicated. $N_2$ adsorption and desorption isotherms were determined on a Micromeritics ASAP 2000 sorptometer at −196° C. The samples were outgassed under 10-5 Torr at 250° C. for ZSM-5 samples and 150° C. for MCM-41 samples.

FIG. 6A shows X-ray powder diffraction patterns of calcined nanosized ZSM-5 crystals prepared by COC-12 and COC-45. Included for comparison is the pattern for ZSM-5 prepared by using Ludox AS-30 as silica source in the absence of carbon. All samples exhibit typical reflections of ZSM-5 prepared from TPA template. FIG. 6B illustrates the XRD patterns of calcined MCM-41 (12) and MCM-41 (45) samples prepared through COC composites. All exhibit XRD patterns with a very intense diffraction peak and two weak peaks, which are characteristic of 2-D hexagonal (P6 mm) structure. Moreover it is very interesting that the XRD patterns of calcined MCM-41 (12) with the average particle size of 12 nm in FIG. 6B shows also ordered 2-D hexagonal structure. Further evidence for the 2-D hexagonal MCM-41 silica with nanosized particles is provided by the following TEM images.

FIGS. 7B to 7E provide the representative TEM images for the ZSM-5 (FIGS. 7B and 7C) and MCM-41 (FIGS. 7D and 7E) nanoparticles formed through the transformation of COC composite. The ZSM-5 and MCM-41 domains shown in these images are very uniform in size. The uniformity of the nanoparticles is correlated with the uniformity of the colloidal silica. These indicate that the colloidal silicas supported in the carbon are transformed into ZSM-5 and MCM-41 nanoparticles while keeping both the sizes and the shape of the colloidal silicas. In contrast, the ZSM-5 prepared using the same reagents in the absence of COC composite shows disordered shape of particle and very broad particle size distribution in the range of 80-300 nm (FIG. 7A). The inset of micrograph in FIGS. 7D and 7E is an expanded image showing an ordered mesopore arrangement typical of MCM-41. In FIG. 7D for MCM-41 (12), the unit cell size of ca. 3.7 nm estimated by the XRD patterns agreed with the distance between the arranged mesopores observed in the TEM image. Moreover, three mesopore arrangement is observed in nanoparticle of MCM-41 (12) and moreover, the total length of three unit cell size of 11.1 nm (3.7 nm ($a_o$)×3=11.1 nm) highly agrees with the average particle size of 12 nm colloidal silica, LUDOX AS-30.

Nitrogen adsorption-desorption isotherms for ZSM-5 and MCM-41 nanoparticles are shown in FIGS. 8A and 8B. For comparison purposes in ZSM-5 samples, the isotherm for conventional ZSM-5 prepared in the absence of COC composite also is included in FIG. 8A. Table 5 provides the specific surface area, pore volumes, and related textural properties for the samples.

TABLE 5

Textural properties of nanosized ZSM-5 crystals formed through transformation of colloidal silicas supported in carbon (COC)[a].

| Sample | $S_{micro}$[b] ($m^2$/g) | $S_{ext}$[b] ($m^2$/g) | $S_{ext}/S_{micro}$ | $V_{micro}$ ($cm^3$/g) | $V_{ext}$ ($cm^3$/g) | $V_{ext}/V_{micro}$ |
|---|---|---|---|---|---|---|
| ZSM-5[c] | 267 | 1 | 0.004 | 0.12 | 0.01 | 0.08 |
| ZSM-5 (12)[d] | 269 | 39 | 0.14 | 0.11 | 0.10 | 0.91 |
| ZSM-5 (45)[d] | 250 | 16 | 0.064 | 0.11 | 0.17 | 1.54 |

[a]Samples were evacuated overnight at 250° C.
[b]From t-plots.
[c]This sample was made from Ludox AS-30 as silica source, but in the absence of a carbon template.
[d]The number in parentheses in the sample label indicates the average particle size (nm) obtained from images.

In order to obtain the external surface areas and microporous volumes reported in Table 5, t-plots were made using the nitrogen adsorption data (Gregg, S. J., et al., *Adsorption, Surface area, and Porosity*, Academic Press: London, (1982)). The ZSM-5 nanoparticles exhibit external surface area to micropore surface area ratio of 0.14 for ZSM-5 (12) and 0.064 for ZSM-5 (45), respectively, while the ratio is 0.004 for the ZSM-5 prepared in the absence of COC transformation. Also, the micropore volume of the ZSM-5 prepared in the absence of CCC transformation is expressed almost entirely as the total pore volume, while the external pore volume of the ZSM-5 nanoparticle shows its total pore volume of 47% for ZSM-5 (12) and 61% for ZSM-5 (45), respectively. The effects of the external activity, expected as the external surface area and the external pore volume, have been known important for very rapid reactions or highly diffusion-limited reactions.

Also, FIG. 8B shows the nitrogen isotherms of MCM-41 nanoparticles, and Table 6 provides the textural parameters for the calcined MCM-41 (12) and MCM-41 (45).

TABLE 6

Textural properties of nanosized MCM-41 formed through transformation of colloidal silicas supported in carbon (COC).

| Sample | $d_{100}$ (nm) | pore size[a] (nm) | wall thickness (nm) | $S_{BET}$[c] ($m^2/g$) | $V_{tot}$ ($cm^3/g$) |
|---|---|---|---|---|---|
| MCM-41 (12) | 3.2 | 2.5 | 1.2 | 1177 | 0.71 |
| MCM-41 (45) | 3.3 | 3.0 | 0.8 | 1108 | 0.76 |

[a]Pore sizes obtained from HK.
[b]Wall thickness calculated by subtraction of pore size from unit cell size ($a_o = 2d_{100}/3$).
[c]Surface area calculated with the BET method.

The mesopore diameters of the samples analyzed by the HK plot are 2.5 nm for MCM-41 (12) and 3.0 nm for MCM-41 (45), and all the samples have very large surface areas (1177 and 1108 $m^2g^{-1}$) and total pore volumes (0.71 and 0.76 $cm^3g^{-1}$). The textural pore volume of the MCM-41 nanoparticle shows its total pore volume of 32% for MCM-41 (12) and 31% for MCM-41 (45), respectively. From the obtained TEM, XRD, and $N_2$ isotherm results, MCM-41 nanoparticles obtained through this work exhibits nanosized particles with relatively higher quality porosity.

Example 10

This example illustrates the nanocasting synthesis of nanosized complex metal oxide, hydroxyapatite (HAP), using a CIC as a template. In a typical synthesis of hydroxyapatite, first 20 ml of 0.1 M $(NH_4)_2HPO_4$ aqueous solution and 15 ml of EtOH were added into 15 g of CIC-13. 20 ml of 0.167 M $Ca(NO_3)_2 4H_2O$ aqueous was added to the mixture of CIC-13 slurry. The pH values of these precursor solutions were adjusted to about 10 by adding concentrated $NH_4OH$. After shaking for 72 hr at room temperature, the black composite was dried at 100° C. overnight, and calcined at 600° C. in the air. The HAP particle was characterized by X-ray diffraction and nitrogen isotherm. The surface areas of the nanometric HAP prepared in the presence of CIC was 88 $m^2/g$, in comparison to a surface area of 45 $m^2/g$ for HAP prepared under analogous conditions without the use of a CIC template.

Thus in Examples 7, 8 and 9, ZSM-5 and MCM-41 nanoparticles were prepared through the directly transformation of colloid silica presented in COC composite. The size of nanoparticles is determined by the size of colloidal silicas supported in carbon template. This transformation method provides a simple and effective way to synthesize the aluminasilicate and/or silicas nanoparticles with not only desired particle size but also the micropore structure and the mesopore structure.

The advantages of nanometric zeolite particles for hydrocarbon processing have been recognized by Jacobson et al. (Jacobsen, Claus J. H.; Madsen, C.; Houzvicka, J.; Schmidt I,; Carlsson, A. *J. Am. Chem. Soc.*, 2000, 122, 7116-7117; Schmidt, I.; Brorson, M.; U.S. Pat. No. 6,476,275 to Schmidt, Brorson and Jacobson). In their approach, a carbon black template with a disordered pore size distribution was used as a template. Consequently, the resulting nanoparticle size distribution for the templated zeolite was very broad.

It is intended that the foregoing description be only illustrative of the present invention and that the present invention be limited only by the hereinafter appended claims.

We claim:

1. A process for forming a metal oxide composition in nanometric particle form which comprises:
    (a) providing a colloid imprinted carbon (CIC) as a nanometric particle template;
    (b) forming through a chemical reaction a metal oxide or a metal oxide precursor in the mesopores of the CIC template; and
    (c) removing the CIC from the product of step (b) by heating the CIC in an oxidizing atmosphere to thereby remove the CIC and to produce the metal oxide in nanometric particle form.

2. The process of claim 1 wherein the metal component of the metal oxide is selected from the metallic elements of groups 1 through 15 of the periodic table, the lanthanide elements, the actinide elements, and mixtures thereof.

3. The process of claim 1 wherein the metal oxide is a zeolite.

4. The process of claim 1 wherein the metal oxide particles are selected from the group consisting of aluminas and silicas and mixtures thereof.

5. The process of claim 1 wherein the metal oxide nanometric particles are spherical and have a diameter of less than 100 nm.

6. The process of claim 1 wherein the metal oxide nanometric particles are a plate with a thickness of less than 100 nm.

7. The process of claim 1 wherein the metal oxide nanometric particles have a dimension of less than 100 nm in at least one dimension.

8. The process of claim 1 wherein the metal oxide nanometric particles aggregate to form larger agglomerates having dimensions greater than 100 nm.

9. The process of claim 1 wherein the CIC template is prepared from pitch tar.

10. The process of claim 1 wherein a metal alkoxide is chemically reacted in the mesopores of the CIC to form a metal oxide or a metal oxide precursor in nanometric particle form.

11. The process of claim 10 wherein the metal alkoxide is selected from the group consisting of a silicon alkoxide and an aluminum alkoxide.

12. The process of claim 1 wherein an aluminate, silicate or a mixture thereof is selected as a precursor to the metal oxide.

13. The process of claim 1 wherein the metal oxide is mesoporous.

14. A process for producing a metal oxide-carbon composite composition in which step (c) in claim 1 is eliminated.

* * * * *

UNITED STATES PATENT AND TRADEMARK OFFICE
CERTIFICATE OF CORRECTION

PATENT NO. : 7,485,282 B2
APPLICATION NO. : 11/087841
DATED : February 3, 2009
INVENTOR(S) : Thomas J. Pinnavaia and Seong-Su Kim It is certified that error appears in the above-identified patent and that said Letters Patent is hereby corrected as shown below:

Column 2, lines 14-23, Delete lines 14-23.

Column 3, line 37, "100 m" should be --100 nm--.

Column 12, line 64, "absence of CCC" should be --absence of COC--.

Signed and Sealed this

Eleventh Day of August, 2009

David J. Kappos
*Director of the United States Patent and Trademark Office*